United States Patent
Oya et al.

(10) Patent No.: US 10,011,297 B2
(45) Date of Patent: Jul. 3, 2018

(54) VEHICLE STEERING DEVICE

(71) Applicant: JTEKT CORPORATION, Osaka-shi, Osaka (JP)

(72) Inventors: Toshiaki Oya, Sakai (JP); Kotaro Okada, Kashiba (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/360,552

(22) Filed: Nov. 23, 2016

(65) Prior Publication Data

US 2017/0151978 A1  Jun. 1, 2017

(30) Foreign Application Priority Data

Nov. 30, 2015  (JP) .................................. 2015-233717

(51) Int. Cl.
  *B62D 6/00*  (2006.01)
  *B62D 5/04*  (2006.01)
  (Continued)

(52) U.S. Cl.
  CPC ........... *B62D 5/0487* (2013.01); *B62D 5/005* (2013.01); *B62D 5/046* (2013.01); *B62D 5/0415* (2013.01);
  (Continued)

(58) Field of Classification Search
  USPC ......................................................... 701/42
  See application file for complete search history.

(56) References Cited

U.S. PATENT DOCUMENTS 5,473,534 A * 12/1995 Miyahara ............. G05B 13/024
  700/37
6,415,212 B2 * 7/2002 Nishizaki ................ B60T 8/172
  180/167
(Continued)

FOREIGN PATENT DOCUMENTS

JP  2001-310751 A  11/2001
JP  2001-322557 A  11/2001
(Continued)

OTHER PUBLICATIONS

Apr. 4, 2017 Extended Search Report issued in European Patent Application No. 16200747.0.

*Primary Examiner* — Tyler Paige
(74) *Attorney, Agent, or Firm* — Oliff PLC

(57) ABSTRACT

A vehicle steering device includes: a target-steered-angle setting unit configured to set a left target steered angle that is a target value of the steered angle of a left steered wheel and a right target steered angle that is a target value of the steered angle of a right steered wheel; left motor controllers configured to control a left steering motor based on a left-steered-angle deviation that is a difference between the left steered angle and the left target steered angle; right motor controllers configured to control a right steering motor based on a right-steered-angle deviation that is a difference between the right steered angle and the right target steered angle; and an abnormality determination unit configured to determine that an abnormality has occurred when an absolute value of difference between the left-steered-angle deviation and the right-steered-angle deviation is equal to or larger than a first threshold.

7 Claims, 7 Drawing Sheets

(51) Int. Cl.
*B62D 5/00* (2006.01)
*B62D 15/02* (2006.01)

(52) U.S. Cl.
CPC ......... *B62D 5/0418* (2013.01); *B62D 5/0481* (2013.01); *B62D 5/0484* (2013.01); *B62D 15/022* (2013.01); *B62D 15/0235* (2013.01)

(56) References Cited

U.S. PATENT DOCUMENTS

| | | | |
|---|---|---|---|
| 6,728,615 | B1 | 4/2004 | Yao et al. |
| 7,698,035 | B2 * | 4/2010 | Chino .................... B62D 5/005 180/204 |
| 8,046,132 | B2 * | 10/2011 | Auguet ................. B62D 6/003 180/415 |
| 9,567,003 | B2 * | 2/2017 | Kageyama ............ B60T 8/1755 |
| 2003/0114969 | A1 * | 6/2003 | Dominke ............... B62D 5/003 701/41 |
| 2004/0138796 | A1 * | 7/2004 | Yao ........................ B62D 5/001 701/41 |
| 2006/0061355 | A1 * | 3/2006 | Wendling ................ G01D 3/08 324/207.25 |
| 2007/0205040 | A1 * | 9/2007 | Miyasaka .............. B62D 5/001 180/444 |
| 2008/0114514 | A1 * | 5/2008 | Auguet ................. B62D 6/003 701/42 |

FOREIGN PATENT DOCUMENTS

| | | |
|---|---|---|
| JP | 2008174160 A | 7/2008 |
| JP | 2015020586 A | 2/2015 |

\* cited by examiner

VEHICLE STEERING DEVICE

INCORPORATION BY REFERENCE

The disclosure of Japanese Patent Application No. 2015-233717 filed on Nov. 30, 2015 including the specification, drawings and abstract, is incorporated herein by reference in its entirety.

BACKGROUND OF THE INVENTION

1. Field of the Invention

The invention relates to a vehicle steering device including right and left steering operation mechanisms configured to respectively turn right and left steered wheels, in which the right and left steering operation mechanisms are not mechanically coupled to a steering member that is operated for steering, and the right and left steering operation mechanisms are respectively driven by right and left steering motors.

2. Description of the Related Art

For purposes of implementing advanced driving support functions typified by autonomous driving and improving flexibility of engine compartment layouts, effectiveness of a steer-by-wire system that does not use an intermediate shaft has begun to be highly regarded. In order to further improve the flexibility of engine compartment layouts, as described in Japanese Patent Application Publication No. 2008-174160 (JP 2008-174160 A) and Japanese Patent Application Publication No. 2015-20586 (JP 2015-20586 A), right and left independent steering systems have been proposed in which steering gear devices including a rack-and-pinion mechanism are not used and right and left steered wheels are controlled by independent steering actuators.

In the steer-by-wire system, a steering motor is feedback controlled so that an actual steered angle is equal to a target steered angle. When the deviation between the actual steered angle and the target steered angle is equal to or larger than a predetermined value, it is determined that some type of abnormality has occurred, and failure processing is performed in general. By the failure processing, the steering motor is stopped, for example.

SUMMARY OF THE INVENTION

An object of the present invention is to provide a vehicle steering device that can determine whether an abnormality has occurred.

A vehicle steering device according to one aspect of the present invention includes: a steering member that is operated for steering; a left steering operation mechanism configured to turn a left steered wheel; and a right steering operation mechanism configured to turn a right steered wheel. The steering member and the left steering operation mechanism are not mechanically coupled together, and the steering member and the right steering operation mechanism are not mechanically coupled together. The left steering operation mechanism is driven by a left steering motor, and the right steering operation mechanism is driven by a right steering motor. The vehicle steering device further includes: a target-steered-angle setter configured to set a left target steered angle that is a target value of a steered angle of the left steered wheel and a right target steered angle that is a target value of a steered angle of the right steered wheel; a left-steered-angle acquisition device configured to acquire a left steered angle that is the steered angle of the left steered wheel; a right-steered-angle acquisition device configured to acquire a right steered angle that is the steered angle of the right steered wheel; a left motor controller configured to control the left steering motor so that a left-steered-angle deviation that is a difference between the left steered angle and the left target steered angle decreases; a right motor controller configured to control the right steering motor so that a right-steered-angle deviation that is a difference between the right steered angle and the right target steered angle decreases; and a determiner configured to determine that an abnormality has occurred when an absolute value of difference between the left-steered-angle deviation and the right-steered-angle deviation is equal to or larger than a first threshold.

With this configuration, when the absolute value of the difference between the left-steered-angle deviation and the right-steered-angle deviation is equal to or larger than the first threshold, it is determined that an abnormality has occurred. Consequently, when either one of the left steering motor and the right steering motor has failed, or when an abnormality has occurred in either one of the left motor controller and the right motor controller, it can be determined that an abnormality has occurred.

With this configuration, when no abnormality occurs in both steering motors and the controllers thereof, and the response of feedback control of the steering motors merely deteriorates temporarily due to, for example, increase in friction coefficient of a road surface or reduction in tire air pressure of right and left steered wheels, the left-steered-angle deviation and the right-steered-angle deviation both increase, and thus it is less likely to be determined that an abnormality has occurred. This can avoid a situation in which it is erroneously determined that an abnormality has occurred in spite of the fact that the response of feedback control of the steering motors merely deteriorates temporarily.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

The following describes embodiments of the present invention with reference to the attached drawings.

Figure 1:
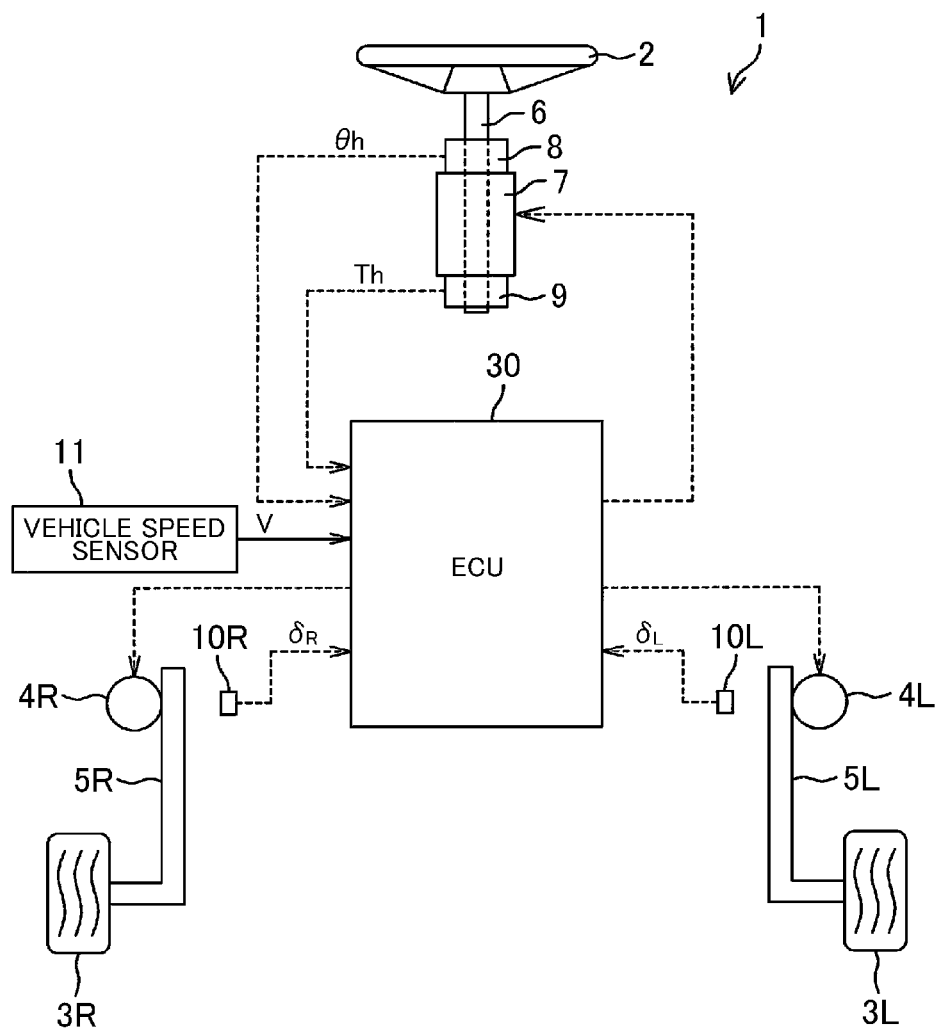
FIG. 1 is a schematic diagram for explaining a structure of a vehicle steering device according to one embodiment of the present invention.

FIG. 1 is a schematic diagram for explaining a structure of a vehicle steering device according to one embodiment of the present invention, in which a structure of a steer-by-wire system using a right-left independent steering system is illustrated.

This vehicle steering device 1 includes a steering wheel 2 serving as a steering member that is operated by a driver to steer a vehicle, a left steered wheel 3L and a right steered wheel 3R, a left steering motor 4L and a right steering motor 4R that are driven in response to rotational operation of the steering wheel 2, a left steering operation mechanism 5L that turns the left steered wheel 3L by the driving force of the left steering motor 4L, and a right steering operation mechanism 5R that turns the right steered wheel 3R by the driving force of the right steering motor 4R.

Between the steering wheel 2 and the left steering operation mechanism 5L and the right steering operation mechanism 5R, there is no mechanical coupling for mechanically transmitting steering torque applied to the steering wheel 2 to the left steering operation mechanism 5L and the right steering operation mechanism 5R. The left steered wheel 3L and the right steered wheel 3R are turned by drive-controlling the left steering motor 4L and the right steering motor 4R, respectively, in accordance with the operation amount (steering angle or steering torque) of the steering wheel 2. As the left steering operation mechanism 5L and the right steering operation mechanism 5R, for example, a suspension device disclosed in JP 2015-20586 A or a steering operation device disclosed in JP 2008-174160 A can be used.

In this embodiment, it is assumed that the steered angles of the steered wheels 3L and 3R change in such a direction that the vehicle is steered to the right (rightward steered direction) when the steering motors 4L and 4R are rotated in a forward rotation direction, and the steered angles of the steered wheels 3L and 3R change in such a direction that the vehicle is steered to the left (leftward steered direction) when the steering motors 4L and 4R are rotated in a reverse rotation direction.

The steering wheel 2 is coupled to a rotary shaft 6 that is rotatably supported on the vehicle body side. This rotary shaft 6 is provided with a reaction motor 7 that generates reaction torque (operation reaction force) acting on the steering wheel 2. This reaction motor 7 is structured with an electric motor having an output shaft that is integrated with the rotary shaft 6, for example.

Around the rotary shaft 6, a steering angle sensor 8 for detecting the rotation angle of the rotary shaft 6 (steering angle $\theta h$ of the steering wheel 2) is provided. In this embodiment, the steering angle sensor 8 is configured to detect the rotation amount (rotation angle) of the rotary shaft 6 in both of forward and reverse directions from a neutral position (reference position) of the rotary shaft 6. The steering angle sensor 8 outputs a rightward rotation amount from the neutral position as a positive value, for example, and outputs a leftward rotation amount from the neutral position as a negative value, for example.

Furthermore, around the rotary shaft 6, a torque sensor 9 for detecting steering torque Th that is applied to the steering wheel 2 by the driver is provided. In this embodiment, it is assumed for the steering torque T detected by the torque sensor 9 that torque for rightward steering is detected as a positive value, torque for leftward steering is detected as a negative value, and the magnitude of the steering torque increases as the absolute value of the detected torque increases.

Near the left steering operation mechanism 5L, a left steered angle sensor 10L for detecting the steered angle $\delta_L$ of the left steered wheel 3L is provided. Near the right steering operation mechanism 5R, a right steered angle sensor 10R for detecting the steered angle $\delta_R$ of the right steered wheel 3R is provided. Furthermore, the vehicle is provided with a vehicle speed sensor 11 for detecting the vehicle speed V.

The steering angle sensor 8, the torque sensor 9, the vehicle speed sensor 11, the left steered angle sensor 10L, the right steered angle sensor 10R, the left steering motor 4L, the right steering motor 4R, and the reaction motor 7 are each connected to an electronic control unit (ECU) 30. The ECU 30 controls the left steering motor 4L, the right steering motor 4R, and the reaction motor 7.

Figure 2:
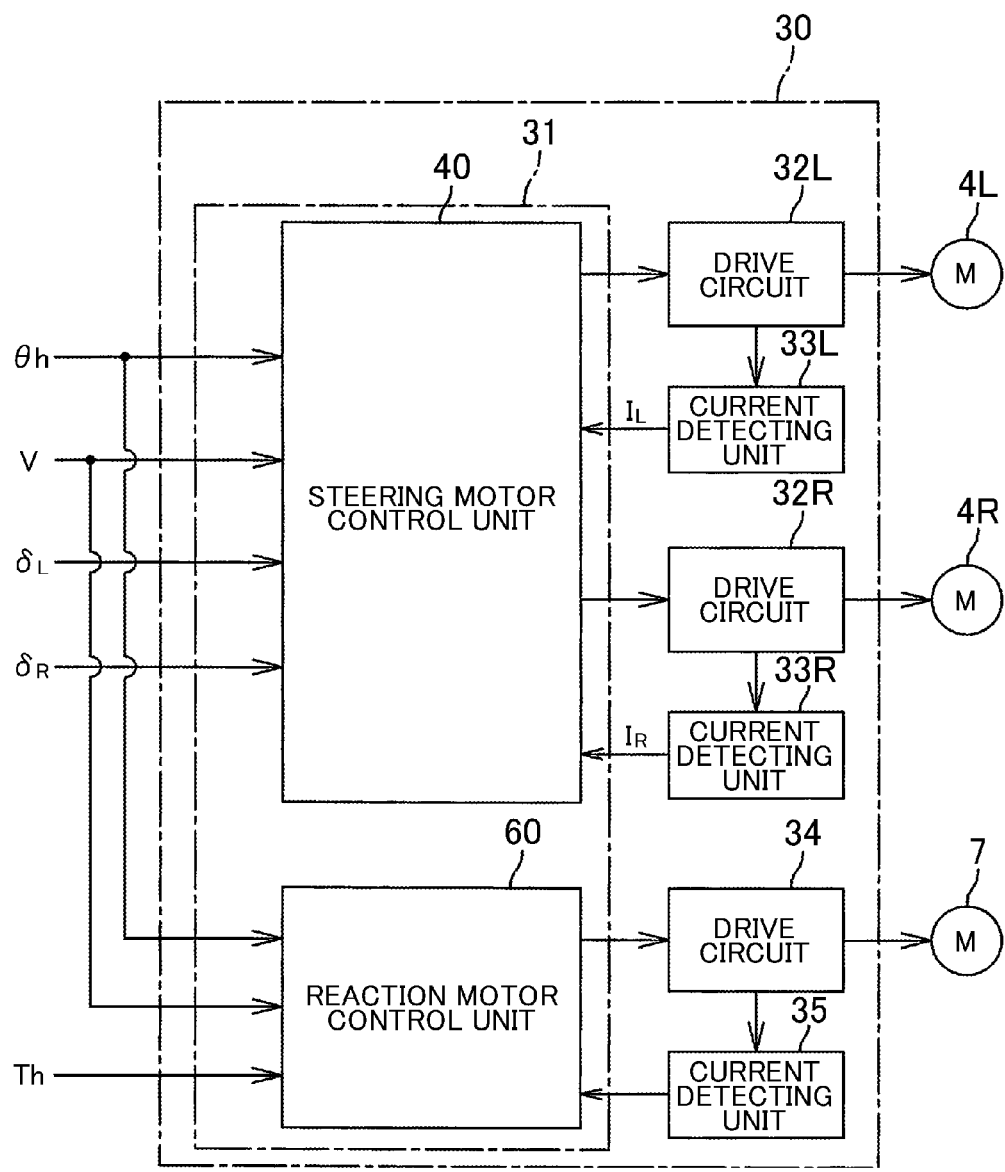
FIG. 2 is a block diagram illustrating an electrical configuration of an ECU.

FIG. 2 is a block diagram illustrating an electrical configuration of the ECU 30.

The ECU 30 includes a microcomputer 31, a drive circuit (inverter circuit) 32L that is controlled by the microcomputer 31 and supplies electric power to the left steering motor 4L, and a current detecting unit 33L that detects a motor current flowing in the left steering motor 4L. The ECU 30 further includes a drive circuit (inverter circuit) 32R that is controlled by the microcomputer 31 and supplies electric power to the right steering motor 4R and a current detecting unit 33R that detects a motor current flowing in the right steering motor 4R. The ECU 30 further includes a drive circuit (inverter circuit) 34 that is controlled by the microcomputer 31 and supplies electric power to the reaction motor 7 and a current detecting unit 35 that detects a motor current flowing in the reaction motor 7.

The microcomputer 31 includes a CPU and memories (a ROM, a RAM, a nonvolatile memory, etc.), and is configured to function as a plurality of function processing units by executing a predetermined program. The function processing units include a steering motor control unit 40 that controls the drive circuit 32L for the left steering motor 4L and the drive circuit 32R for the right steering motor 4R and a reaction motor control unit 60 that controls the drive circuit 34 for the reaction motor 7.

The reaction motor control unit 60 drives the drive circuit 34 for the reaction motor 7 on the basis of the steering torque Th detected by the torque sensor 9, the steering angle $\theta h$ detected by the steering angle sensor 8, the vehicle speed V detected by the vehicle speed sensor 11, and the motor current detected by the current detecting unit 35. For example, the reaction motor control unit 60 computes a target reaction torque that is a target value of reaction torque needed to be generated by the reaction motor 7 on the basis of the steering torque Th, the steering angle $\theta h$, and the vehicle speed V. The reaction motor control unit 60 then drives the drive circuit 34 for the reaction motor 7 so that reaction torque corresponding to the target reaction torque is generated by the reaction motor 7.

The steering motor control unit 40 drives the drive circuits 32L and 32R for the steering motors 4L and 4R on the basis of the steering angle $\theta h$ detected by the steering angle sensor 8, the vehicle speed V detected by the vehicle speed sensor 11, the left steered angle $\delta_L$ and the right steered angle $\delta_R$ respectively detected by the left steered angle sensor 10L and the right steered angle sensor 10R, and the motor currents detected by the current detecting units 33L and 33R. The following describes the steering motor control unit 40 in detail.

Figure 3:
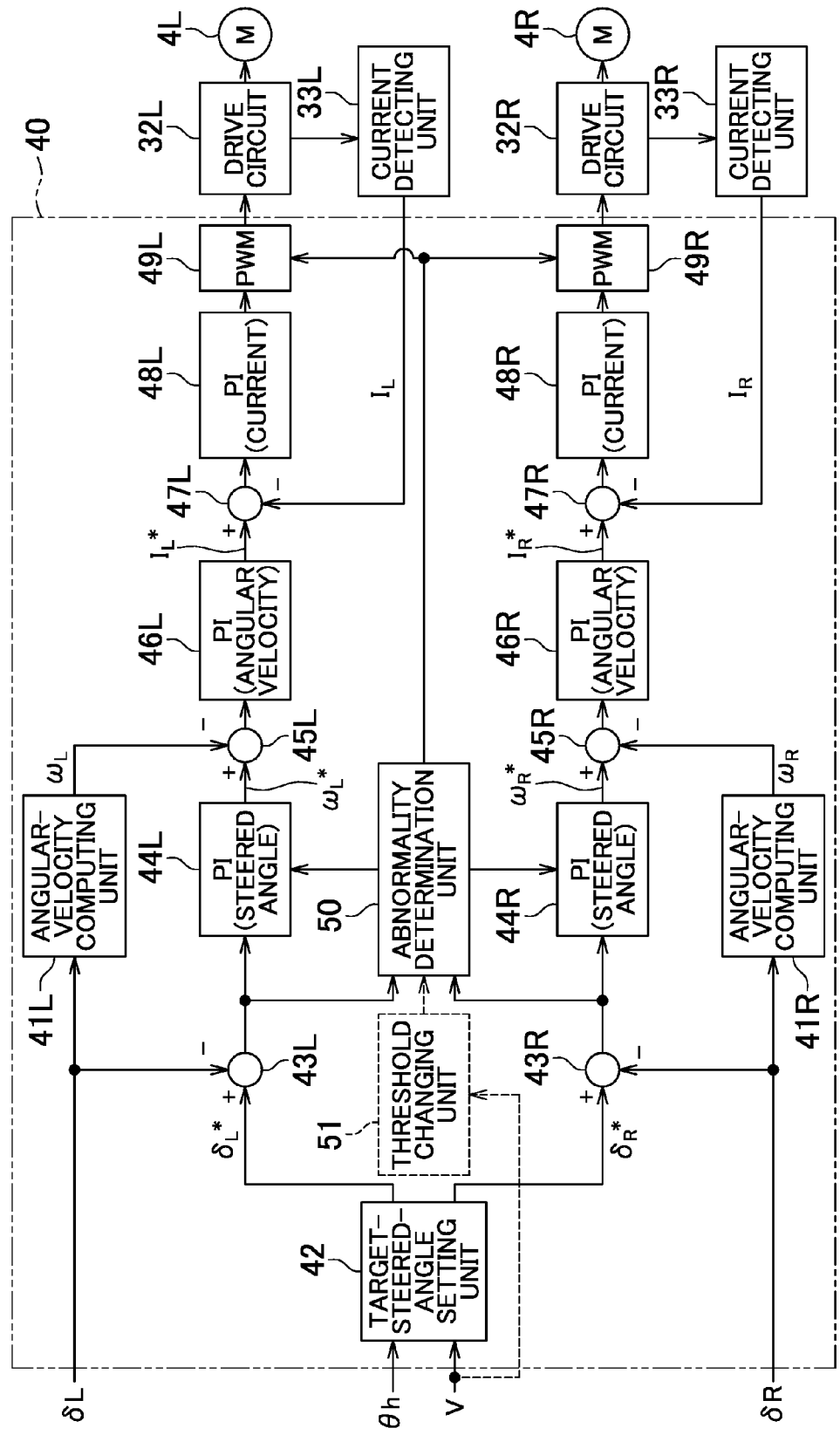
FIG. 3 is a block diagram illustrating a configuration example of a steering motor control unit.

FIG. 3 is a block diagram illustrating a configuration example of the steering motor control unit 40.

The steering motor control unit 40 includes angular-velocity computing units 41L and 41R, a target-steered-angle setting unit 42, steered-angle deviation computing units 43L and 43R, PI control units (steered angle) 44L and 44R, angular-velocity deviation computing units 45L and 45R, PI control units (angular velocity) 46L and 46R, current deviation computing units 47L and 47R, PI control units (current) 48L and 48R, pulse width modulation (PWM) control units 49L and 49R, and an abnormality determination unit 50.

The angular-velocity computing unit 41L computes the angular velocity (left steered angular velocity) $\omega_L$ of the left steered angle $\delta_L$ by differentiating the left steered angle $\delta_L$ detected by the left steered angle sensor 10L with respect to time. The angular-velocity computing unit 41R computes the angular velocity (right steered angular velocity) $\omega_R$ of the right steered angle $\delta_R$ by differentiating the right steered angle $\delta_R$ detected by the right steered angle sensor 10R with respect to time.

The target-steered-angle setting unit 42 sets a left target steered angle $\delta_L^*$ that is a target value of the steered angle of the left steered wheel 3L and a right target steered angle $\delta_R^*$ that is a target value of the steered angle of the right steered wheel 3R on the basis of the steering angle θh and the vehicle speed V.

The steered-angle deviation computing unit 43L computes the deviation $\Delta\delta_L$ $(=\delta_L^*-\delta_L)$ between the left steered angle $\delta_L$ detected by the left steered angle sensor 10L and the left target steered angle $\delta_L^*$ set by the target-steered-angle setting unit 42. The steered-angle deviation computing unit 43R computes the deviation $\Delta\delta_R$ $(=\delta_R^*-\delta_R)$ between the right steered angle $\delta_R$ detected by the right steered angle sensor 10R and the right target steered angle $\delta_R^*$ set by the target-steered-angle setting unit 42.

The PI control unit 44L computes a left target steered angular velocity $\omega_L^*$ that is a target value of the left steered angular velocity by performing PI computation on the left-steered-angle deviation $\Delta\delta_L$ computed by the steered-angle deviation computing unit 43L. The PI control unit 44R computes a right target steered angular velocity $\omega_R^*$ that is a target value of the right steered angular velocity by performing PI computation on the right-steered-angle deviation $\Delta\delta_R$ computed by the steered-angle deviation computing unit 43R.

The angular-velocity deviation computing unit 45L computes the deviation $\Delta\omega_L$ $(=\omega_L^*-\omega_L)$ between the left steered angular velocity $\omega_L$ computed by the angular-velocity computing unit 41L and the left target steered angular velocity $\omega_L^*$ computed by the PI control unit 44L. The angular-velocity deviation computing unit 45R computes the deviation $\Delta\omega_R$ $(=\omega_R^*-\omega_R)$ between the right steered angular velocity $\omega_R$ computed by the angular-velocity computing unit 41R and the right target steered angular velocity $\omega_R^*$ computed by the PI control unit 44R.

The PI control unit 46L computes a left target motor current $I_L^*$ that is a target value of current needed to be fed to the left steering motor 4L by performing PI computation on the left-steered-angular-velocity deviation $\Delta\omega_L$ computed by the angular-velocity deviation computing unit 45L. The PI control unit 46R computes a right target motor current $I_R^*$ that is a target value of current needed to be fed to the right steering motor 4R by performing PI computation on the right-steered-angular-velocity deviation $\Delta\omega_R$ computed by the angular-velocity deviation computing unit 45R.

The current deviation computing unit 47L computes the deviation $\Delta I_L$ $(=I_L^*-I_L)$ between the left motor current $I_L$ detected by the current detecting unit 33L and the left target motor current $I_L^*$ computed by the PI control unit 46L. The current deviation computing unit 47R computes the deviation $\Delta I_R$ $(I_R^*-I_R)$ between the right motor current $I_R$ detected by the current detecting unit 33R and the right target motor current $I_R^*$ computed by the PI control unit 46R.

The PI control unit 48L generates a left motor-drive command value for leading the left motor current $I_L$ flowing in the left steering motor 4L to the left target motor current $I_L^*$ by performing PI computation on the left-motor-current deviation $\Delta I_L$ computed by the current deviation computing unit 47L. The PI control unit 48R generates a right motor-drive command value for leading the right motor current $I_R$ flowing in the right steering motor 4R to the right target motor current $I_R^*$ by performing PI computation on the right-motor-current deviation $\Delta I_R$ computed by the current deviation computing unit 47R.

The PWM control unit 49L generates a left PWM control signal having a duty ratio corresponding to the left motor-drive command value, and provides this signal to the drive circuit 32L. Consequently, electric power corresponding to the left motor-drive command value is supplied to the left steering motor 4L. The PWM control unit 49R generates a right PWM control signal having a duty ratio corresponding to the right motor-drive command value, and provides this signal to the drive circuit 32R. Consequently, electric power corresponding to the right motor-drive command value is supplied to the right steering motor 4R.

The steered-angle deviation computing unit 43L and the PI control unit 44L constitute an angle feedback controller. By the function of this angle feedback controller, the steered angle $\delta_L$ of the left steered wheel 3L is controlled so as to approach the left target steered angle $\delta_L^*$ set by the target-steered-angle setting unit 42. The angular-velocity deviation computing unit 45L and the PI control unit 46L constitute an angular-velocity feedback controller. By the function of this angular-velocity feedback controller, the left steered angular velocity $\omega_L$ is controlled so as to approach the left target steered angular velocity $\omega_L^*$ computed by the PI control unit 44L. The current deviation computing unit 47L and the PI control unit 48L constitute a current feedback controller. By the function of this current feedback controller, the motor current $I_L$ flowing in the left steering motor 4L is controlled so as to approach the left target motor current $I_L^*$ computed by the PI control unit 46L.

In the same manner, the steered-angle deviation computing unit 43R and the PI control unit 44R constitute an angle feedback controller. By the function of this angle feedback controller, the steered angle $\delta_R$ of the right steered wheel 3R is controlled so as to approach the right target steered angle $\delta_R^*$ set by the target-steered-angle setting unit 42. The angular-velocity deviation computing unit 45R and the PI control unit 46R constitute an angular-velocity feedback controller. By the function of this angular-velocity feedback controller, the right steered angular velocity $\omega_R$ is controlled so as to approach the right target steered angular velocity $\omega_R^*$ computed by the PI control unit 44R. The current deviation computing unit 47R and the PI control unit 48R constitute a current feedback controller. By the function of this current feedback controller, the motor current $I_R$ flowing in the right steering motor 4R is controlled so as to approach the right target motor current $I_R^*$ computed by the PI control unit 46R.

The following describes operation of the abnormality determination unit 50 in detail.

Figure 4:
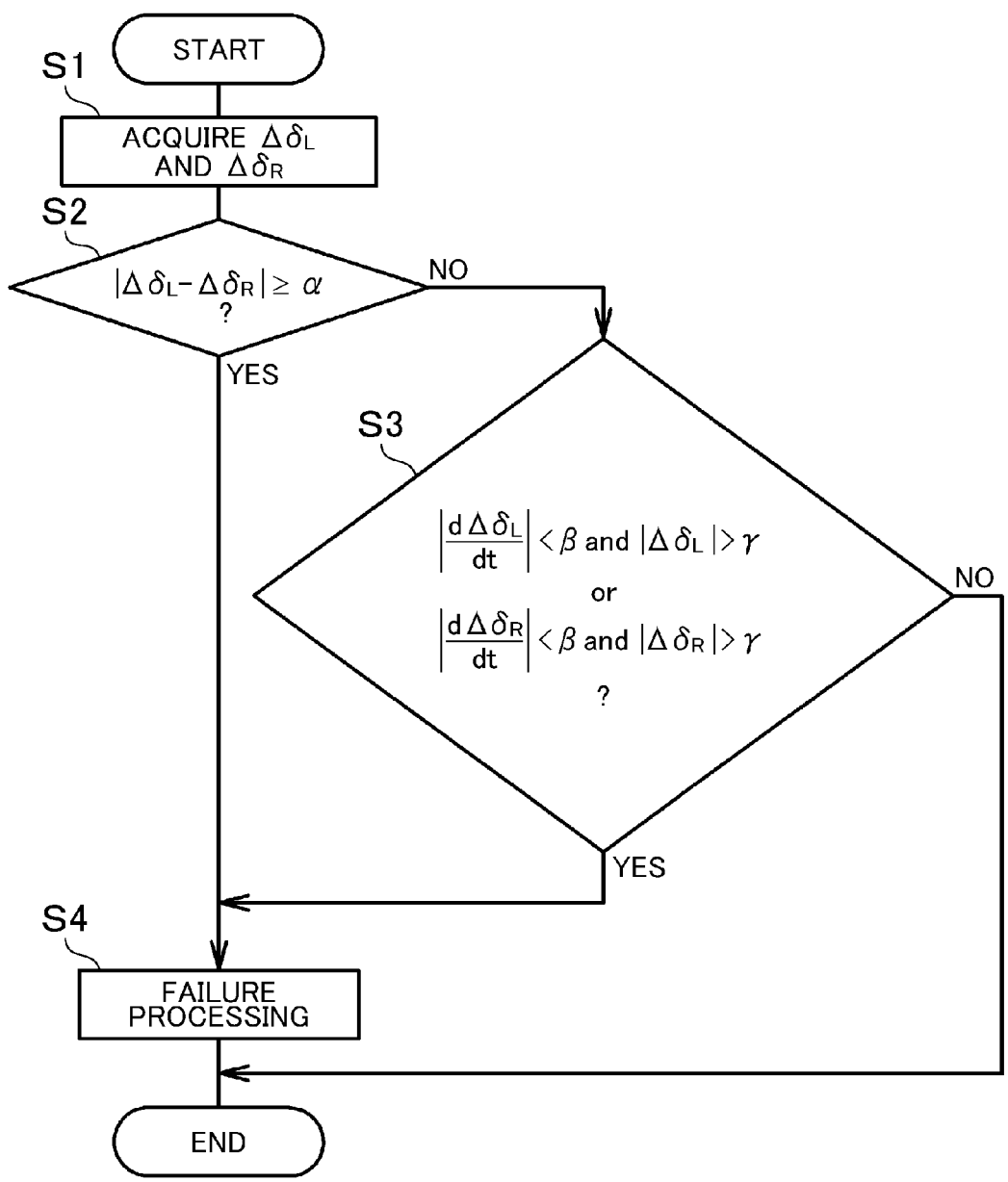
FIG. 4 is a flowchart for explaining operation of an abnormality determination unit.

FIG. 4 is a flowchart for explaining the operation of the abnormality determination unit 50. The processes depicted in FIG. 4 are repeatedly performed in every predetermined computation cycle.

The abnormality determination unit 50 acquires the left-steered-angle deviation $\Delta\delta_L$ computed by the steered-angle deviation computing unit 43L and the right-steered-angle deviation $\Delta\delta_R$ computed by the steered-angle deviation computing unit 43R (step S1).

Subsequently, the abnormality determination unit 50 determines whether the first condition of Formula (1) below is satisfied.

$$|\Delta\delta_L - \Delta\delta_R| \geq \alpha \qquad (1)$$

In Formula (1), $|\Delta\delta_L - \Delta\delta_R|$ is the absolute value of the difference between the left-steered-angle deviation $\Delta\delta_L$ and the right-steered-angle deviation $\Delta\delta_R$. $\alpha$ (>0) is a predetermined first threshold. As described later, the first threshold $\alpha$ may be changed depending on the vehicle speed V.

The abnormality determination unit 50 determines that the first condition is satisfied when the absolute value $|\Delta\delta_L - \Delta\delta_R|$ of the difference between the left-steered-angle deviation $\Delta\delta_L$ and the right-steered-angle deviation $\Delta\delta_R$ is equal to or larger than the first threshold $\alpha$. For example, when either one of the left steering motor 4L and the right steering motor 4R has failed, or when an abnormality has occurred in either one of the control system of the left steering motor 4L and the control system of the right steering motor 4R, the first condition is satisfied. However, when no abnormality occurs in both steering motors 4L and 4R and the control systems thereof, and the response of feedback control merely deteriorates temporarily due to, for example, increase in friction coefficient of a road surface or reduction in tire air pressure of the right and left steered wheels, $\Delta\delta_L$ and $\Delta\delta_R$ both increase, and thus the first condition is not satisfied.

At step S2, if the abnormality determination unit 50 determines that the first condition is not satisfied (NO at step S2), that is, when $|\Delta\delta_L - \Delta\delta_R|$ is smaller than $\alpha$, the process proceeds to step S3.

At step S3, the abnormality determination unit 50 determines whether the second condition of Formula (2) below is satisfied.

$$|d\Delta\delta_L/dt| < \beta \text{ and } |\Delta\delta_L| > \gamma$$

or $$|d\Delta\delta_R/dt| < \beta \text{ and } |\Delta\delta_R| > \gamma \qquad (2)$$

In Formula (2), $|d\Delta\delta_L/dt|$ is the absolute value of the time derivative of the left-steered-angle deviation $\Delta\delta_L$, which represents the absolute value of the time rate of change of the left-steered-angle deviation $\Delta\delta_L$. $|d\Delta\delta_R/dt|$ is the absolute value of the time derivative of the right-steered-angle deviation $\Delta\delta_R$, which represents the absolute value of the time rate of change of the right-steered-angle deviation $\Delta\delta_R$. $\beta$ (>0) is a predetermined second threshold. $\gamma$ (>0) is a predetermined third threshold. As described later, the second threshold $\beta$ and the third threshold $\gamma$ may be changed depending on the vehicle speed V.

The abnormality determination unit 50 determines that the second condition is satisfied when the absolute value $|d\Delta\delta_L/dt|$ of the time rate of change of the left-steered-angle deviation $\Delta\delta_L$ is smaller than the second threshold $\beta$ and the absolute value $|\Delta\delta_L|$ of the left-steered-angle deviation $\Delta\delta_L$ is larger than the third threshold $\gamma$, or when the absolute value $|d\Delta\delta_R/dt|$ of the time rate of change of the right-steered-angle deviation $\Delta\delta_R$ is smaller than the second threshold $\beta$ and the absolute value $|\Delta\delta_R|$ of the right-steered-angle deviation $\Delta\delta_R$ is larger than the third threshold $\gamma$.

In other words, when the absolute value of the time rate of change of the left-steered-angle deviation $\Delta\delta_L$ is smaller than $\beta$ but the absolute value of the left-steered-angle deviation $\Delta\delta_L$ is larger than $\gamma$, or when the absolute value of the time rate of change of the right-steered-angle deviation $\Delta\delta_R$ is smaller than $\beta$ but the absolute value of the right-steered-angle deviation $\Delta\delta_R$ is larger than $\gamma$, the second condition is satisfied. For example, at least one of the left steering motor 4L and the right steering motor 4R has failed, or when an abnormality has occurred in at least one of the control system of the left steering motor 4L and the control system of the right steering motor 4R, the second condition is satisfied.

At step S3, if it is determined that the second condition is not satisfied (NO at step S3), the abnormality determination unit 50 determines that no abnormality has occurred, and ends the processes in the current computation cycle.

At step S2, if it is determined that the first condition is satisfied (YES at step S2), that is, when $|\Delta\delta_L - \Delta\delta_R|$ is equal to or larger than $\alpha$, the abnormality determination unit 50 determines that an abnormality has occurred, and performs failure processing (step S4). The failure processing stops the left steering motor 4L and the right steering motor 4R. For example, the abnormality determination unit 50 controls the PWM control units 49L and 49R so that no current is fed to the steering motors 4L and 4R.

At step S3, if it is determined that the second condition is satisfied (YES at step S3), that is, when $|d\Delta\delta_L/dt|$ is smaller than $\beta$ and $|\Delta\delta_L|$ is larger than $\gamma$ or when $|d\Delta\delta_R/dt|$ is smaller than $\beta$ and $|\Delta\delta_R|$ is larger than $\gamma$, the abnormality determination unit 50 determines that an abnormality has occurred, and performs the failure processing (step S4).

In the embodiment above, when the absolute value $|\Delta\delta_L - \Delta\delta_R|$ of the difference between the left-steered-angle deviation $\Delta\delta_L$ and the right-steered-angle deviation $\Delta\delta_R$ is equal to or larger than the first threshold $\alpha$, it can be determined that an abnormality has occurred. When the absolute value of the time rate of change of the left-steered-angle deviation $\Delta\delta_L$ is smaller than $\beta$ but the absolute value of the left-steered-angle deviation $\Delta\delta_L$ is larger than $\gamma$, or when the absolute value of the time rate of change of the right-steered-angle deviation $\Delta\delta_R$ is smaller than $\beta$ but the absolute value of the right-steered-angle deviation $\Delta\delta_R$ is larger than $\gamma$, it can be determined that an abnormality has occurred. Thus, when at least one of the left steering motor 4L and the right steering motor 4R has failed, or when an abnormality has occurred in at least one of the control system of the left steering motor 4L and the control system of the right steering motor 4R, it can be determined that an abnormality has occurred.

In the foregoing, one embodiment of the present invention has been described. However, the present invention may be applied to other embodiments. For example, in the embodiment above, the first threshold $\alpha$, the second threshold $\beta$, and the third threshold $\gamma$ are fixed. However, the first threshold $\alpha$, the second threshold $\beta$, and the third threshold $\gamma$ may be changed depending on the vehicle speed V. Specifically, as indicated by the dashed lines in FIG. 3, a threshold changing unit 51 is provided. The threshold changing unit 51 changes the first threshold $\alpha$, the second threshold $\beta$, and the third threshold $\gamma$ in accordance with the vehicle speed V detected by the vehicle speed sensor 11.

Figure 5:
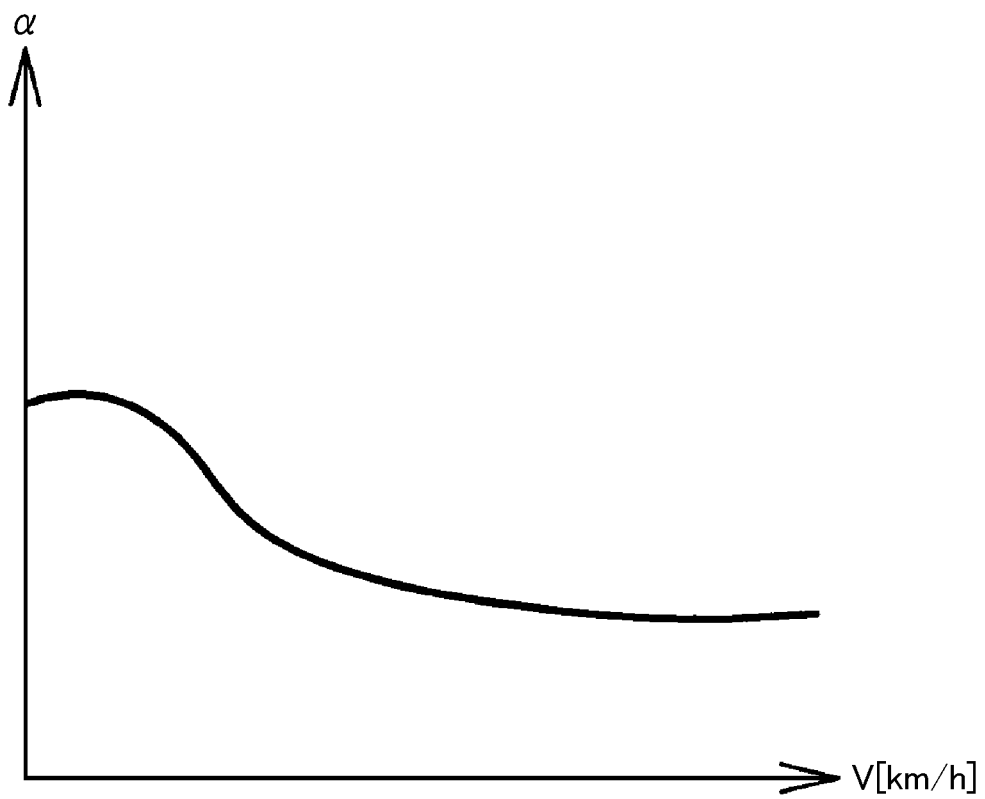
FIG. 5 is a graph illustrating a relationship between a vehicle speed V and a first threshold $\alpha$.

More specifically, the threshold changing unit 51 sets the first threshold $\alpha$ corresponding to the vehicle speed V on the basis of a map in which a relationship between the vehicle speed V and the first threshold $\alpha$ is stored. FIG. 5 is a graph illustrating the relationship between the vehicle speed V and the first threshold $\alpha$. The first threshold $\alpha$ is set so as to be a larger value in a low-speed range of the vehicle speed and, in a range other than the low-speed range, so as to be an approximately constant value that is smaller than the value in the low-speed range. This is because during stationary steering performed while the vehicle is substantially stationary, load increases and the response of control becomes slow (the absolute values of the steered-angle deviations $\Delta\delta_L$ and $\Delta\delta_R$ increase), and thus the first condition can be easily satisfied even if no abnormality has occurred. In view of this, in order to prevent the first condition from being easily satisfied during stationary steering, the first threshold $\alpha$ is set larger when the vehicle speed is low.

Figure 6:
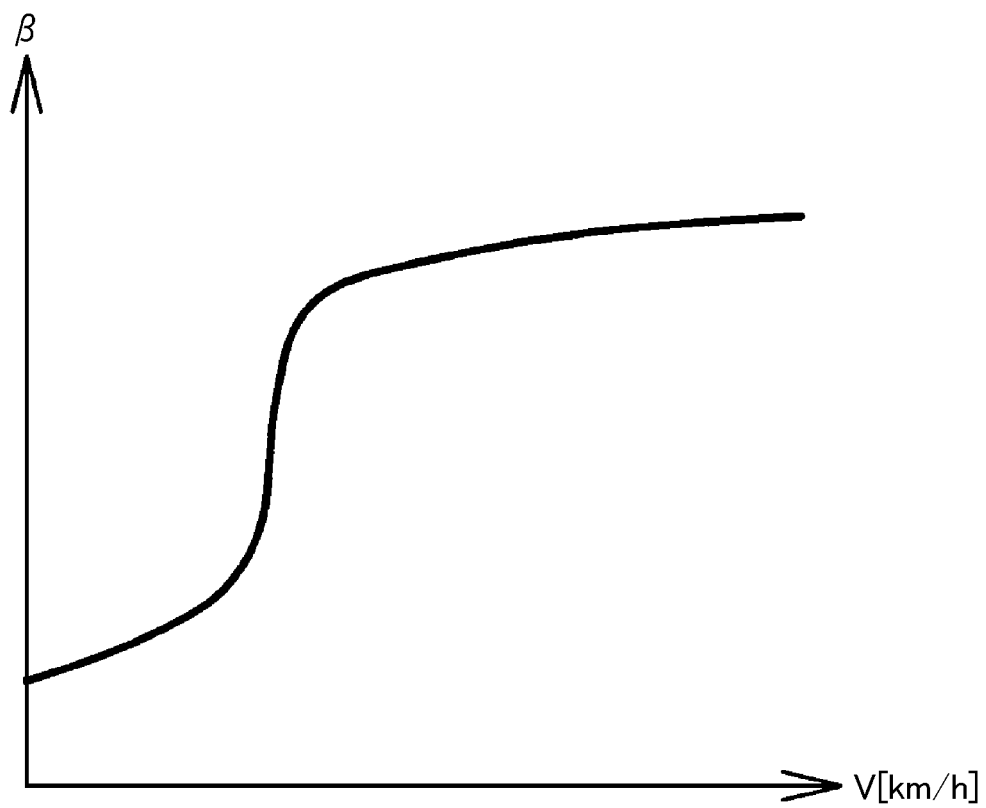
FIG. 6 is a graph illustrating a relationship between the vehicle speed V and a second threshold $\beta$.

The threshold changing unit 51 sets the second threshold $\beta$ corresponding to the vehicle speed V on the basis of a map in which a relationship between the vehicle speed V and the second threshold $\beta$ is stored. FIG. 6 is a graph illustrating the relationship between the vehicle speed V and the second threshold $\beta$. The second threshold $\beta$ is set so as to be a smaller value in a low-speed range of the vehicle speed and, after the vehicle speed exceeds the low-speed range, so as to sharply increase and then gradually increase. This is because during stationary steering performed while the vehicle is substantially stationary, load increases and the response of control becomes slow (the absolute values of the time rates of change of the steered-angle deviations $\Delta\delta_L$ and $\Delta\delta_R$ decrease), and thus the second condition can be easily satisfied even if no abnormality has occurred. In view of this, in order to prevent the second condition from being easily satisfied during stationary steering, the second threshold $\beta$ is set smaller when the vehicle speed is low.

Figure 7:
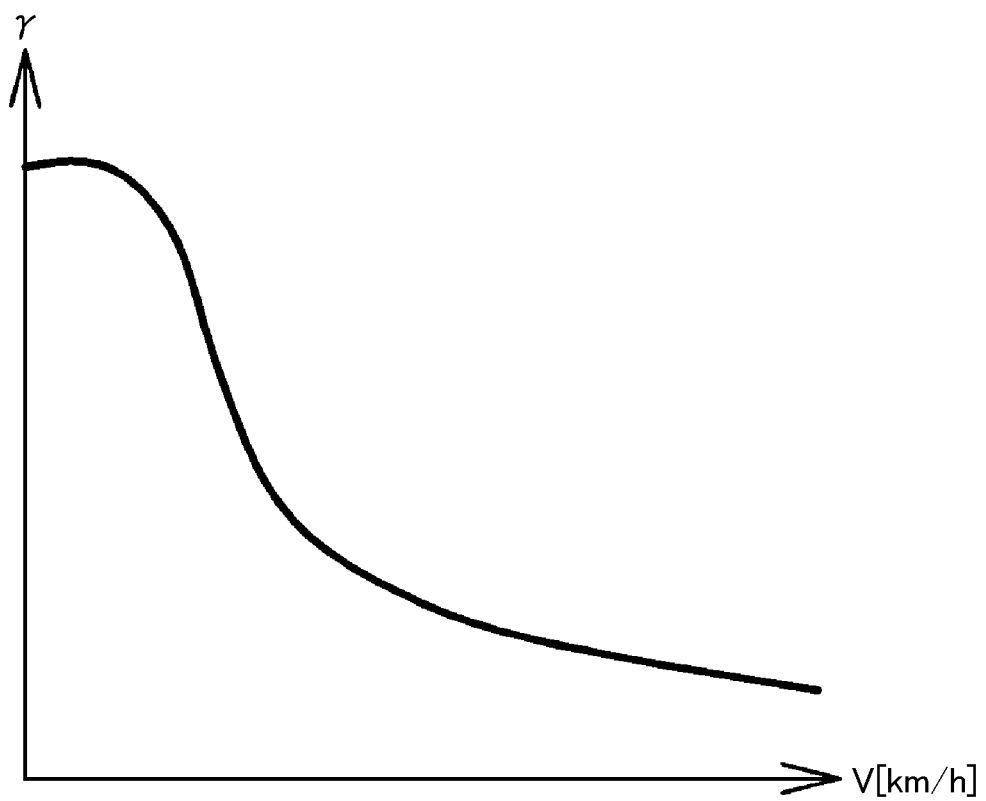
FIG. 7 is a graph illustrating a relationship between the vehicle speed V and a third threshold $\gamma$.

The threshold changing unit 51 sets the third threshold $\gamma$ corresponding to the vehicle speed V on the basis of a map in which a relationship between the vehicle speed V and the third threshold $\gamma$ is stored. FIG. 7 is a graph illustrating the relationship between the vehicle speed V and the third threshold $\gamma$. The third threshold $\gamma$ is set so as to be a larger value in a low-speed range of the vehicle speed and, after the vehicle speed exceeds the low-speed range, so as to sharply decrease and then gradually decrease. Thus, in order to prevent the second condition from being easily satisfied during stationary steering, the third threshold $\gamma$ is set larger when the vehicle speed is low.

In the embodiment described above, the second condition used at step S3 in FIG. 4 is the condition of Formula (2). However, the second condition may be a condition of Formula (3):

$$|d\Delta\delta_L/dt|<\beta$$

or $$|d\Delta\delta_R/dt|<\beta \quad (3)$$

In this case, the abnormality determination unit 50 determines that the second condition is satisfied when the absolute value $|d\Delta\delta_L/dt|$ of the time rate of change of the left-steered-angle deviation $\Delta\delta_L$ is smaller than the second threshold $\beta$, or when the absolute value $|d\Delta\delta_R/dt|$ of the time rate of change of the right-steered-angle deviation $\Delta\delta_R$ is smaller than the second threshold $\beta$.

In the embodiment described above, if it is determined that the first condition is not satisfied at step S2 in FIG. 4 (NO at step S2), the process proceeds to step S3 in FIG. 4. However, if it is determined that the first condition is satisfied at step S2 in FIG. 4 (NO at step S2), the abnormality determination unit 50 may determine that no abnormality has occurred to end the processes in the current computation cycle. In other words, step S3 in FIG. 4 may be omitted.

What is claimed is:

1. A vehicle steering device comprising:
a steering member that is operated for steering;
a left steering operation mechanism configured to turn a left steered wheel;
a right steering operation mechanism configured to turn a right steered wheel, the steering member and the left steering operation mechanism being not mechanically coupled together, the steering member and the right steering operation mechanism being not mechanically coupled together, the left steering operation mechanism being driven by a left steering motor, and the right steering operation mechanism being driven by a right steering motor;
an electronic control unit configured to set a left target steered angle that is a target value of a steered angle of the left steered wheel and a right target steered angle that is a target value of a steered angle of the right steered wheel;
a left-steered-angle acquisition device configured to acquire a left steered angle that is the steered angle of the left steered wheel;
a right-steered-angle acquisition device configured to acquire a right steered angle that is the steered angle of the right steered wheel;
a left motor controller configured to control the left steering motor so that a left-steered-angle deviation that is a difference between the left steered angle and the left target steered angle decreases; and
a right motor controller configured to control the right steering motor so that a right-steered-angle deviation that is a difference between the right steered angle and the right target steered angle decreases, wherein
the electronic control unit is further configured to determine that an abnormality has occurred when an absolute value of a difference between the left-steered-angle deviation and the right-steered-angle deviation is equal to or larger than a first threshold.

2. The vehicle steering device according to claim 1, wherein the electronic control unit is configured to determine that the abnormality has occurred when at least one of an absolute value of a time rate of change of the left-steered-angle deviation and an absolute value of a time rate of change of the right-steered-angle deviation is smaller than a second threshold.

3. The vehicle steering device according to claim 1, wherein the electronic control unit is configured to determine that the abnormality has occurred when an absolute value of the left-steered-angle deviation is larger than a third threshold and an absolute value of a time rate of change of the left-steered-angle deviation is smaller than a fourth threshold, or when an absolute value of the right-steered-angle deviation is larger than the third threshold and an absolute value of a time rate of change of the right-steered-angle deviation is smaller than the fourth threshold.

4. The vehicle steering device according to claim 1, further comprising:
a vehicle-speed acquisition device configured to acquire a vehicle speed, wherein
the electronic control unit is further configured to change the first threshold in accordance with the vehicle speed acquired by the vehicle-speed acquisition device.

5. The vehicle steering device according to claim 2, further comprising:
a vehicle-speed acquisition device configured to acquire a vehicle speed, wherein
the electronic control unit is further configured to change the first threshold in accordance with the vehicle speed acquired by the vehicle-speed acquisition device, and to change the second threshold in accordance with the vehicle speed acquired by the vehicle-speed acquisition device.

6. The vehicle steering device according to claim 3, further comprising:
a vehicle-speed acquisition device configured to acquire a vehicle speed, wherein
the electronic control unit is further configured to change the first threshold in accordance with the vehicle speed acquired by the vehicle-speed acquisition device, to change the third threshold in accordance with the vehicle speed acquired by the vehicle-speed acquisition device, and to change the fourth threshold in accordance with the vehicle speed acquired by the vehicle-speed acquisition device.

7. The vehicle steering device according to claim 1, wherein the abnormality is a malfunction of one of the left steering motor, the right steering motor, the left motor controller or the right motor controller.

* * * * *